(12) United States Patent
Richter et al.

(10) Patent No.: US 7,557,457 B2
(45) Date of Patent: Jul. 7, 2009

(54) METHOD FOR THE OPERATION OF WIND POWER PLANTS

(75) Inventors: Kay Richter, Norderstedt (DE); Thomas Paul Woldmann, Hamburg (DE); Mark Jurkat, Norderstedt (DE)

(73) Assignee: Nordex Energy GmbH, Norderstedt (DE)

( * ) Notice: Subject to any disclaimer, the term of this patent is extended or adjusted under 35 U.S.C. 154(b) by 0 days.

(21) Appl. No.: 11/840,543

(22) Filed: Aug. 17, 2007

(65) Prior Publication Data

US 2008/0042442 A1 Feb. 21, 2008

(30) Foreign Application Priority Data

Aug. 21, 2006 (DE) ....................... 10 2006 039 693

(51) Int. Cl.
*H02P 9/04* (2006.01)
*F03D 9/00* (2006.01)
(52) U.S. Cl. ....................................................... 290/44
(58) Field of Classification Search ..................... 290/44
See application file for complete search history.

(56) References Cited

U.S. PATENT DOCUMENTS

| | | | |
|---|---|---|---|
| 6,462,432 B1 * | 10/2002 | Seelig et al. .................. | 307/33 |
| 6,838,781 B2 * | 1/2005 | van de Loo ................ | 290/40 B |
| 7,046,166 B2 * | 5/2006 | Pedyash et al. ........ | 340/870.07 |
| 7,269,751 B2 * | 9/2007 | Janakiraman et al. ....... | 713/323 |
| 7,394,166 B2 * | 7/2008 | Teichmann et al. ........... | 290/44 |
| 2004/0217881 A1 * | 11/2004 | Pedyash et al. ........ | 340/870.07 |
| 2005/0028017 A1 * | 2/2005 | Janakiraman et al. ....... | 713/340 |
| 2007/0154311 A1 * | 7/2007 | Kabatzke et al. ................ | 416/1 |
| 2007/0194574 A1 * | 8/2007 | Kabatzke et al. .............. | 290/44 |
| 2008/0084070 A1 * | 4/2008 | Teichmann et al. ........... | 290/55 |

FOREIGN PATENT DOCUMENTS

| | | |
|---|---|---|
| DE | 10019362 A1 | 10/2001 |
| DE | 100 59 018 A1 | 6/2002 |
| DE | 10136974 A1 | 11/2002 |
| DE | 103 44 392 A1 | 6/2005 |
| EP | 1 508 951 A1 | 8/2004 |
| WO | WO 2006066797 A1 * | 6/2006 |

OTHER PUBLICATIONS

Gerardo Tapia, Arantxa Tapia, Jose Ramon Saenz, A New Simple and Robust Control Strategy for Wind Farm Reactive Power Regulation, Proceedings of the 2002 IEEE International Conference on Control Applications, Sep. 18-20, 2002 Glasgow Scotland, U.K., 880-885.
B. Rabelo, N. Hofmann, Control of an Optimized Power in Wind Power Plants with Doubly-Fed Induction Generators, TU Chemnitz, Institute of Electrical Machines and Drive 09126, Chemnitz, Germany, 1563-1568, 2003.

* cited by examiner

*Primary Examiner*—Nicholas Ponomarenko
*Assistant Examiner*—Pedro J Cuevas
(74) *Attorney, Agent, or Firm*—Vidas, Arrett & Steinkraus, P.A.

(57) ABSTRACT

Method for the operation of a wind power plant with controllable effective power, wherein an idle power interval defined by a minimum idle power and a maximum idle power is assigned to each value of the effective power and the actual idle power can be controlled within this interval, characterized in that the effective power is reduced when a target idle power lies outside of the idle power interval assigned to the current effective power.

8 Claims, 2 Drawing Sheets

METHOD FOR THE OPERATION OF WIND POWER PLANTS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a method for the operation of wind power plants, more specifically to a method for the operation of a wind power plant with controllable effective power, wherein an idle power interval is assigned to each effective power and the delivered idle power within this idle power interval is controllable In the case of the operation of wind power plants, it is known to also create idle power in addition to the effective power that is important for energy generation. The idle power can on one hand serve to compensate an idle resistance generated by individual components of the wind power plant in order not to load a mains power supply coupled with the wind power plant. Additionally, a support of the voltage of the mains power supply can also be achieved through a targeted allocation of idle power, Normally, the idle power is determined by the specification of a so-called power factor $\cos \phi$, which can cover a certain value range, e.g. from 0.95 capacitive to 0.95 inductive. The phase angle $\phi$ thereby describes the phase displacement between voltage and power. The power factor $\cos \phi$ then corresponds with the ratio between the effective power P and the apparent power S:

$$\cos \phi = P/S.$$

The following correlation applies for the apparent power S:

$$S^2 = P^2 + Q^2.$$

For a specified power factor, the idle power is proportional to the effective power so that, in the case of a low effective power, only a low idle power is generally made available. If the power factor is specified, for example by the operator of the mains power supply, the maximum possible idle power cannot be created in partial load mode.

At the same time, the electrical components of the wind power plant must be designed such that the current flow set for the maximum effective and idle power does not lead to an overload. As a general rule, the electrical components are to be designed such that they even withstand the load in the case of an effective power lying above the nominal power for a short period of time and—simultaneously—maximum idle power.

In the case of the known wind power plants, the created effective power generally results from the wind conditions. In order to protect the wind power plant from an overload at high wind speeds, the effective power is restricted to a maximum value. This generally results in a speed regulation of the rotor or generator by varying the adjustment angle of the rotor blades for the predetermined, maximum torque, wherein the effective power is regulated to the desired maximum value.

DE 100 59 018 A1, the entire contents of which is incorporated herein by reference, specifies a method for the operation of a wind power plant, in which the regulation of the idle power takes place depending on the effective power mainly determined by the wind conditions such that a constant apparent power is set. The apparent power of the wind power plant is thus independent on the amount of wind. In the known method, it is also provided to deviate from the constant apparent power if the released effective power or idle power should not exceed a specified maximum value.

EP 1 508 951 A1, the entire contents of which is incorporated herein by reference, specifies a method for the operation of a wind farm with a plurality of wind power plants that are linked together and feed effective and idle power to a mains power supply via a hub point. A primary control thereby specifies set-target values for the effective and idle power of individual wind power plants. The goal is to support the voltage on the hub point in that a certain idle power is made available to the entire wind farm and at the same time to minimize the load of the network connecting these plants through an optimized distribution of effective and idle power to be created to the individual wind power plants. The idle power provided by one single wind power plant can thereby lie for a certain effective power value within a range depending on the permissible amperage in the rotor and stator coils of the generator. In particular, it is thereby possible to also provide a high idle power in the case of low effective powers.

DE 103 44 392 A1, the entire contents of which is incorporated herein by reference, specifies a wind power plant with an idle power control module and a device for determining a minimum safe effective power. Based on a supporting idle current desired for the support of the network in the case of voltage decreases, the idle power control module controls the idle power fed into the network. On one hand, this ensures that the supplied effective power does not drop below a minimum value specified by the device for determining a minimum safe effective power; on the other hand, a fixed, specified, maximum apparent power is taken into consideration. The target values for effective and idle power are corrected in a multistage method of calculation.

Based on this, the object of the invention is to provide a method for the operation of a wind energy power plant in which a specified idle power can be achieved regardless of the wind conditions.

BRIEF SUMMARY OF THE INVENTION

The method according to the invention refers to a wind power plant with controllable effective power, wherein an idle power interval defined by a minimum idle power and a maximum idle power is assigned to each value of the effective power and the actual idle power can be controlled within this interval, wherein the method serves to reduce the effective power if a target idle power lies outside of the idle power interval assigned to the current effective power.

In the case of the method according to the invention, the target idle power is also achieved when it lies outside of the idle power interval that can be set with the current effective power, in that the effective power is reduced, thereby increasing the available idle power interval. Thus, under certain circumstances, the effective power is decreased in favor of a higher idle power and thus the idle power is prioritized with respect to the effective power.

The target idle power can be specified in different manners. It is possible to specify a target idle power as a parameter in the wind power plant control. This can be set locally in the wind power plant or via a central wind farm controller. Both specifications can be made by the wind power plant operator. Alternatively, an external specification can take place through a current collector, for example a power supply company. This external specification can directly determine the target idle power, i.e. without the cooperation of the wind power plant operator. The specification can be static or time-dependent, for example in order to fulfil different requirements at different times of day. Furthermore, a specification of the target idle power can take place depending on the current effective power. For this, a function can be defined, which assigns a target idle power to each effective power. A controller of the target idle power as a control variable in the case of a regulation of the output voltage is also possible. The set target idle power can thereby take place depending on a target value for the voltage and a voltage present at the output of a voltage regulator.

The method ensures that a high idle power can be made available even in the case of favorable wind conditions and a correspondingly high potential effective power output. The demand of network operators to provide a high idle power can be achieved in this manner. Moreover, several wind power plants or wind farms can be connected to weaker networks, since the highly available idle power ensures a larger contribution to the network stability.

Particularly advantageous with respect to the method known from DE 103 44 392 A1, the entire contents of which is incorporated herein by reference, is that a minimum and a maximum idle power are assigned to each value of the effective power. These idle power values are directly available and can be forwarded, for example, to improve the network management to a power company, which thus receives an overview of the available idle power reserve, which can be accessed without losses in effective power.

In a preferred embodiment of the invention, the actual idle power is controlled to the maximum idle power or to the minimum idle power of the idle power interval assigned to the current effective power if the target idle power is outside this idle power interval and the current effective power is less than a specified minimum effective power. It does thus not drop below a certain specified effective power level. In this case, the required target idle power is not made available. Instead, the maximum or minimum value of the idle power interval coming closest to the required target idle power is set. This can thus be accomplished that at least a minimum effective power is always provided. Thus, a compromise can be made between the required target idle power and the released effective power, which leads for example to optimal remuneration.

In one embodiment, the assignment of the minimum idle power and the maximum idle power to each value of the effective power takes place based on the maximum current carrying capacity of a component of the wind power plant, wherein the dependency of the maximum current carrying capacity of the component is taken into consideration by at least one of the operating variables of the wind power plant. The observance of this operating point dependency of the maximum current carrying capacity enables a more complete utilization of the capacity of the wind power plant. The observed operating variable can for example be the speed of the generator, which has an effect on its cooling capacity. In the case of higher speeds, the air circulation in the generator and thus the cooling capacity rise, thereby resulting in an increased current carrying capacity of the generator. Another considered operating variable can be the frequency of the current flow in the rotor circuit, which lies close to zero in the synchronous operating point of the generator. Such low frequencies lead to a direct-current-like load on the rotor circuit, in particular to the associated semiconductor switch of the converter so that the current carrying capacity can be reduced based on thermal effects.

In lower- or upper-synchronous mode, the current carrying capacity increases so that correspondingly larger idle power intervals can be utilized. The at least one operating variable can be linked with the effective power. For example, this is the case for the generator speed. Thus, the at least one operating variable can be implicitly considered in the assignment of the minimum and maximum idle power for the effective power, i.e. that an idle power interval is clearly assigned to each effective power. Alternatively, the at least one operating variable can be incorporated as an additional parameter in the evaluation of the assignment specification. In this case, the assignment is a multi-parameter assignment in terms of an indicator field. If several operating variables are taken into consideration, a separate parameter can be assigned to each operating variable. If necessary, measured values of the operating variables can be used to evaluate the assignment specification.

In one embodiment, the assignment of the minimum idle power and the maximum idle power to each value of the effective power takes place based on the maximum current carrying capacity of a component of the wind power plant, wherein the dependency of the maximum current carrying capacity of the component is taken into consideration by at least one environmental condition of the wind power plant. The environmental conditions can flow into the assignment specification, as with the operating variables described above. Environmental conditions with a detectable impact on the current carrying capacity are for example temperature, wind speed or air pressure.

In another preferred embodiment of the invention, the minimum idle power and the maximum idle power for each effective power are calculated from the permissible current carrying capacity of the stator and rotor coils of the generator of the wind power plant. The current carrying capacity of the individual components can thereby be dependent on other parameters. As already explained above, the available cooling capacity and/or the environmental temperature can be taken in consideration in particular in order to avoid a thermal overload. The cooling capacity can in turn depend on the amount of wind and the effective power. The current carrying capacity of the named coils represents an important upper limit for the current carrying capacity of the entire wind power plant. It is thereby ensured that the stator and rotor coils of the generator are not overloaded.

In accordance with another preferred embodiment of the invention, the minimum idle power and the maximum idle power for each effective power are calculated from the permissible current carrying capacity of all current-carrying components of the wind power plants. The current-carrying components thereby comprise all components of the wind power plant located in the circuit between the generator and the mains power supply, in particular the semiconductor switch of the converter. It is ensured through this calculation of the idle power interval that not only the rotor and stator coils of the generator are protected from an overload, but rather all current-carrying components. An over-dimensioning e.g. of the converter, which may be provided as a precautionary measure, can thus be omitted.

In accordance with one embodiment, a control parameter that can accept two different values is provided, wherein the method is executed with a first value of the control parameter and the effective power is reduced as necessary, while no reduction in the effective power takes place in the case of a second value of the control parameter. If the control parameter has the first value, the idle power is prioritized over the effective power, as explained above. If it has the second value, the effective power can in particular be prioritized over the idle power. The control parameter can be adjusted via software, either locally in the wind power plant or centrally from a wind farm controller. The selection of the value for the control parameter can be arranged for example in accordance with the requirements of a current collector and/or the compensation rules for supplied effective and idle power.

BRIEF DESCRIPTION OF SEVERAL VIEWS OF THE DRAWINGS

The invention is explained in greater detail below based on an exemplary embodiment shown in two figures.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
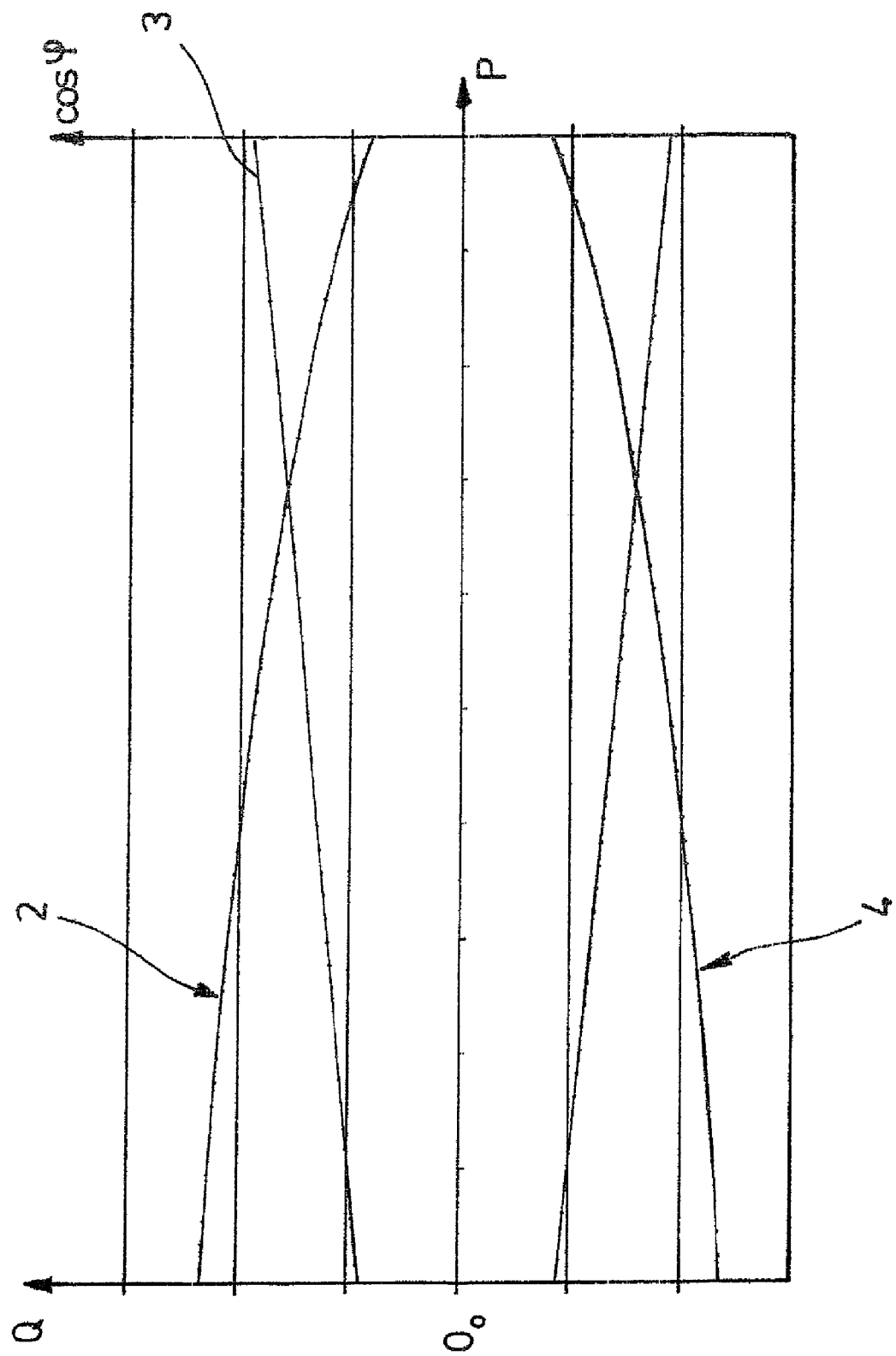
FIG. 1 shows a diagram with the assignment of idle power intervals to the effective power.

FIG. 1 shows the connection between the idle power Q and effective power P.

The effective power P is shown on the abscissa. The shown effective power range begins at zero and extends up to a maximum effective power, which may exceed the nominal power of the wind power plant by a certain amount. On the ordinate, a maximum idle power Q (curve 2) and a minimum idle power Q (curve 4) are assigned to each effective power P. The amounts of the minimum and maximum idle powers assigned to a certain effective power value in curves 2 and 4 correspond with a specified or registered idle power, which corresponds with a capacitive or inductive idle power. The amounts must not be equal.

The curves 2 and 4 are identified taking into consideration the permissible current carrying capacity of all relevant components of the wind power plant. The current carrying capacities and the thermal capacities of the rotor and stator coils as well as the converter are incorporated in particular. As a result, the curves 2 and 4 show a progression that approximates a root function. One would obtain a progression that is exactly equal to a root function if one would only include a constant apparent power when calculating the permissible idle powers.

Figure 2:
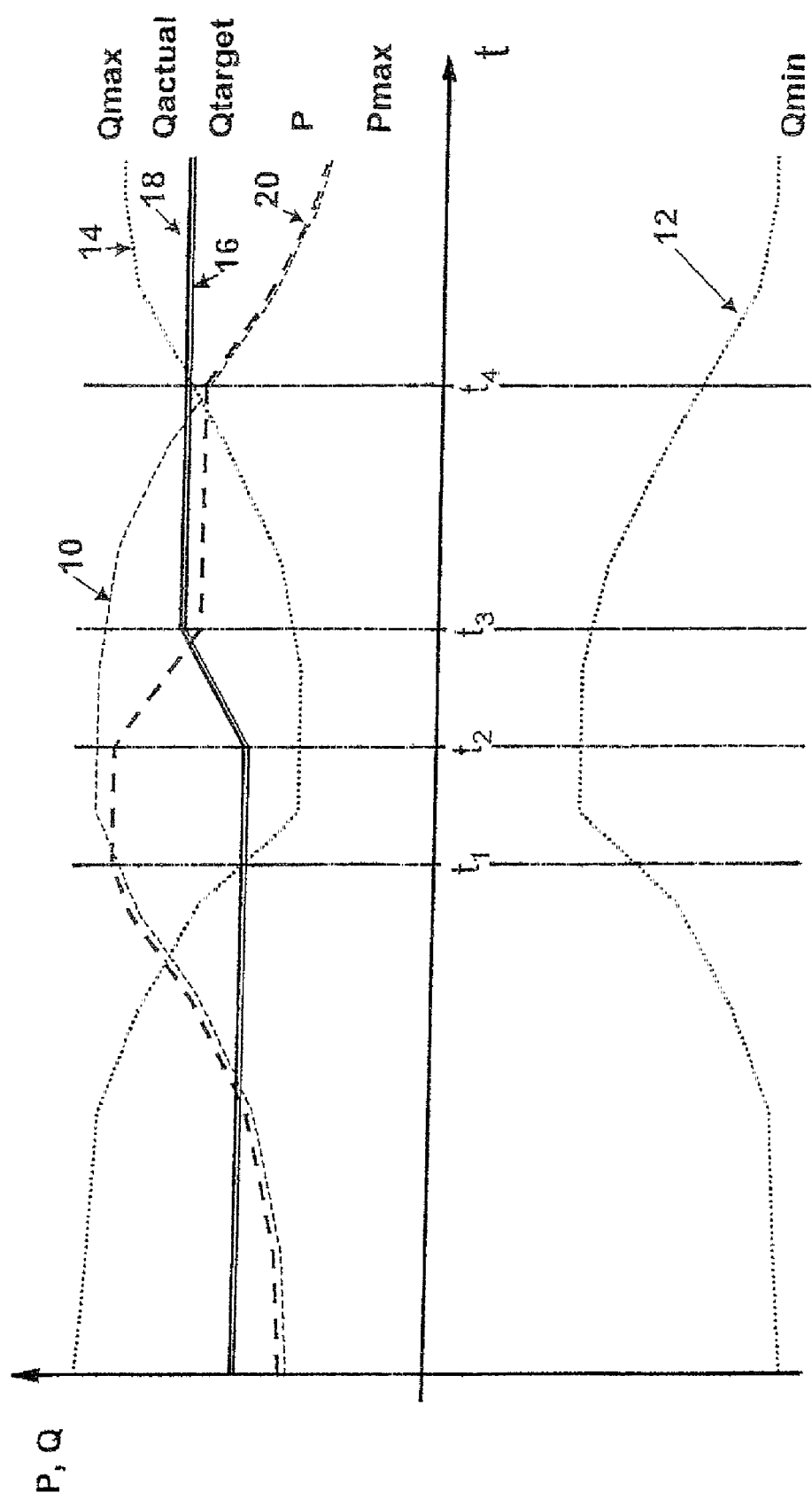
FIG. 2 shows a diagram with time progression of the effective and idle power when using the method according to the invention.

FIG. 2 shows the mode of operation of the power control system over time.

The dashed curve 10 shows a maximum effective power $P_{max}$ resulting from the amount of wind power. In the time segment shown in the diagram, this theoretically possible maximum effective power includes, beginning from relatively low values, a maximum around point $t_2$ and then drops again.

In line with the correlation between the effective power and the maximum or minimum idle power shown in FIG. 1, the two dotted curves are shown in the diagram in FIG. 2 starting from curve 10 for the minimum idle power $Q_{min}$ (curve 12) and the maximum idle power $Q_{max}$ (curve 14). Thus, an idle power interval depending on the maximum possible effective power $P_{max}$ (curve 10) between the two curves 12 and 14 is assigned to each point in time. It is easy to see that, in the case of a lower maximum possible effective power $P_{max}$, this interval is greater than in the case of a comparatively large maximum possible effective power $P_{max}$.

Furthermore, a specified target idle power $Q_{target}$ (curve 16) is shown as a thin solid line 16 in the diagram. This target idle power corresponds with an external specification. The shown target idle power proceeded up to time $t_2$ at a first constant level, then increases up to time $t_3$ and subsequently proceeds at a second constant level.

The mode of operation of the controller according to the invention is now on the bold curves 18 and 20, which show the actual released idle power $Q_{actual}$ (solid curve 18) and effective power P (dashed curve 20).

The release idle power $Q_{actual}$ corresponds with the specified idle power $Q_{target}$ during the entire time progression. A regulation of the released idle power to the specified target value $Q_{target}$ takes place. The insignificant displacement of the two curves 16 and 18 only serves to improve recognizability.

The released effective power P only partially corresponds with the maximum possible effective power $P_{max}$. In the time interval between $t_1$ and $t_4$, the released effective power P is lower than the theoretically possible effective power $P_{max}$. The deviation begins at point in time $t_1$. At this time, the upper limit of the attainable idle power interval shown by curve 14 for the maximum possible effective power $P_{max}$ drops below the specified idle power $Q_{target}$ (curve 16). Thus, the effective power $P_{max}$ is reduced with respect to the maximum possible effective power $P_{max}$. It runs up to time $t_2$ at a constant value. This value corresponds with that of the effective power value, in which the upper limit of the idle power interval corresponds with the target idle power, i.e. with the value shown at time $t_1$. The target idle power is increased beginning with time $t_2$. This required target idle power cannot be achieved with the effective power P released at time $t_2$, because it lies outside of the idle power interval assigned to this effective power. Thus, the released effective power P by time $t_3$ is further reduced. The released idle power $Q_{actual}$ can thus be increased according to the target value $Q_{target}$.

At time $t_3$, the specified target idle power assumes a constant value again. Accordingly, the effective power P also remains at a constant level, which is compatible with the required target idle power. At time $t_4$, the maximum creatable effective power $P_{max}$ drops to the current value P at time 4 as a result of a reduced amount of wind. The maximum possible effective power $P_{max}$ is subsequently reduced as a result of the decreasing amount of wind. In this case, the actual effective power P provided follows the maximum possible level $P_{max}$. The released idle power $Q_{actual}$ thereby remains at the level of the target idle power value, which as of time $t_4$ again lies within the idle power interval assigned to the maximum possible effective power $P_{max}$.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Method of operating a wind power plant with a controllable effective power, wherein an idle power interval defined by a minimum idle power (12) and a maximum idle power (14) is assigned to each value of the effective power (20) and an actual idle power (18) being controlled within the idle power interval assigned to the value of the effective power, characterized in that the effective power (20) is reduced when a target idle power (16) lies outside of the idle power interval assigned to the current effective power.

2. Method according to claim 1, characterized in that the actual idle power is controlled to the maximum idle power or to the minimum idle power of the idle power interval assigned to the current effective power and the effective power is not reduced when the target idle power is outside this idle power interval and the current effective power is smaller than a specified maximum effective power.

3. Method according to claim 1, characterized in that the assignment of the minimum idle power and the maximum idle power to each value of the effective power depends upon a maximum current carrying capacity of a component of the wind power plant, wherein the dependency of the maximum current carrying capacity of the component is taken into consideration by at least one operating variable of the wind power plant.

4. Method according to claim 1, characterized in that the assignment of the minimum idle power and the maximum idle power to each value of the effective power depends upon a maximum current carrying capacity of a component of the wind power plant, wherein the dependency of the maximum current carrying capacity of the component is taken into consideration by at least one environmental condition of the wind power plant.

5. Method according to claim 1, the wind power plant having a generator, the generator having stator and rotor coils, characterized in that the minimum idle power and the maximum idle power for each effective power are calculated from a permissible current carrying capacity of the stator and rotor coils of the generator of the wind power plant.

6. Method according to claim 1, characterized in that the minimum idle power and the maximum idle power for each effective power are calculated from a permissible current carrying capacity of all current-carrying components of the wind power plant.

7. Method according to claim 1, characterized in that a control parameter is provided, the control parameter having a first value and a second value, the first value being different than the second value, wherein the effective power is reduced for the first value of the control parameter and the effective power is not reduced for the second value of the control parameter.

8. A method of operating a wind power plant, the wind power plant generating a maximum effective power, the maximum effective power being generated in response to wind, comprising:
   determining a target idle power for each value of maximum effective power being generated in response to wind;
   determining a minimum idle power and a maximum idle power for each value of a maximum effective power, the minimum idle power and the maximum idle power defining a idle power interval, the idle power interval being assigned to each value of the maximum effective power; and
   controlling an amount of released effective power and the amount of the actual idle power so that the amount of the actual idle power corresponds to the amount of the target idle power, the amount of release effective power being at most equal to the maximum effective power being generated in response to wind;
   wherein when the target idle power is outside of the idle power interval for the value of the maximum effective power, the amount of released effective power is reduced.

* * * * *